(12) United States Patent
Pirovano

(10) Patent No.: US 6,765,775 B2
(45) Date of Patent: Jul. 20, 2004

(54) SUBMARINE CABLE BRANCHING UNIT WITH CURRENT LIMITER

(75) Inventor: Alberto Pirovano, Casatenovo (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 32 days.

(21) Appl. No.: 10/026,883

(22) Filed: Dec. 27, 2001

(65) Prior Publication Data

US 2002/0126435 A1 Sep. 12, 2002

Related U.S. Application Data

(60) Provisional application No. 60/259,223, filed on Jan. 3, 2001.

(30) Foreign Application Priority Data

Dec. 27, 2000 (EP) ............................ 00128547

(51) Int. Cl.[7] .............................................. H02M 3/08
(52) U.S. Cl. ..................... 361/93.1; 361/93.9; 361/191; 307/38; 307/112; 307/131; 385/16; 385/45
(58) Field of Search .......................... 361/42, 62, 93.1, 361/93.9, 111, 119, 166, 167, 170, 191, 58; 307/38, 39, 41, 100, 112, 113, 115, 131, 180; 385/15, 16, 39, 41, 42, 45

(56) References Cited

U.S. PATENT DOCUMENTS

| 4,573,098 | A | * | 2/1986 | Williston ..................... 361/42 |
|---|---|---|---|---|
| 5,196,984 | A | | 3/1993 | Webb |
| 5,214,312 | A | | 5/1993 | Inoue |
| 5,491,368 | A | * | 2/1996 | Yamamoto ................... 307/113 |
| 5,517,383 | A | | 5/1996 | Webb |
| 5,644,466 | A | | 7/1997 | Ohta |
| 5,655,036 | A | * | 8/1997 | Webb ........................... 385/15 |
| 5,781,386 | A | * | 7/1998 | Muelleman ................... 361/43 |
| 5,841,205 | A | | 11/1998 | Webb |
| 6,121,765 | A | * | 9/2000 | Carlson ....................... 323/359 |
| 6,157,098 | A | * | 12/2000 | Kojima et al. .............. 307/139 |

FOREIGN PATENT DOCUMENTS

| GB | 2 280 341 | 1/1995 |
|---|---|---|
| WO | WO 00/59126 | 10/2000 |

OTHER PUBLICATIONS

Perry et al., "Physical Design of the SL Branching Repeater", Journal of Lightwave Technology, vol. LT–2, pp. 889–894 (1984), no month.

* cited by examiner

Primary Examiner—Michael Sherry
Assistant Examiner—Gary L. Laxton
(74) Attorney, Agent, or Firm—Finnegan, Henderson, Farabow, Garrett & Dunner, L.L.P.

(57) ABSTRACT

A submarine branching unit is disclosed that includes a termination for each of at least three line cables and a termination to sea ground. A relay is positioned between each pair of cable terminations. When current flows between two of the cables, the intermediary relay will become energized and cause a contact to connect the third cable to the sea-ground termination. To avoid dangerous surges in current to sea ground when a relay trips, a current limiter is placed in series with the sea ground termination.

12 Claims, 6 Drawing Sheets

SUBMARINE CABLE BRANCHING UNIT WITH CURRENT LIMITER

CROSS REFERENCE TO RELATED APPLICATIONS

This application claims the benefit of U.S. Provisional Application No. 60/259,223, filed Jan. 3, 2001, the content of which is incorporated herein by reference, and claims the right to priority based on European Application No. 00128547.7, filed Dec. 27, 2000.

BACKGROUND OF THE INVENTION

The present invention relates generally to a branching unit for underwater cables. More particularly, the invention relates to a branching unit for underwater telecommunication cables having a circuit in series with sea ground that limits peak current flowing through a relay in the branching unit, which extends the life of the relay and prevents any arc inside the relay envelope due to high current when the relay contact closes that could cause a main trunk cable to be shorted to sea earth.

Underwater or submarine cable systems were originally designed to provide a telecommunications link between two landing points separated by a body of water, such as France and England. Optical fiber within the submarine cable could carry high bandwidth telecommunications across tens of kilometers without the need for amplification or regeneration.

As applications evolved that required transmission across larger distances, optical repeaters in the form of regenerators or amplifiers were required within the cable span, which mandated the availability of electrical power. Power feed lines and optical transmission lines were provided together in the submarine cables. These cable systems were soon improved to provide a telecommunications connection to three or more separate landing points by employing a branching unit at the junction of multiple cables under the body of water. A standard branching unit connected a main cable from one landing point and two spur cables from second and third landing points, respectively, in a Y-shaped arrangement.

FIG. 1 illustrates a typical three landing point connection scheme. Branching unit 100 physically interconnects the cables, coordinates the routing of the cables, and provides for power switching between the cables, among other things. Conventionally, stations at the landing points power repeaters 120 within the three cables in a two-sided and one-sided arrangement. In particular, the transmission of electrical direct current along a power feed line of the intervening cables is established between any two of the landing points, and the third landing point passes electrical current through its respective cable to a ground at sea earth. Relays within the branching unit establish the two-sided (bilateral) and one-sided (unilateral) feeding configuration and help to change it if a fault arises in one of the branches. More elaborate schemes also exist for connecting multiple landing points and multiple branching units in a submarine network.

The act of configuring a branching unit refers to coordinating the application of power from the respective landing points by providing a first power connection (two-sided) between any two landing points and a second power connection (one-sided) between the third landing point and sea earth. The two-sided power connection between the above two landing points can be either a two-end feeding as shown in FIGS. 2A, 2B, i.e., a generator is present at each of the two landing points or, alternatively, a one-end feeding, i.e., a generator is present at one of the landing points and the cable is grounded at the other of the two landing points.

FIGS. 2A and 2B illustrate the two configuration steps. As shown in FIG. 2A, a low current is caused to flow from landing point A to landing point C via branching unit 100. In this arrangement, the line from A to C is nominated as the main trunk, and the spur branch to landing point B is left in an open-circuit condition. FIG. 2B shows that after the main trunk has been established, the one-sided powering of the spur takes place by shunting the spur to sea earth at the branching unit and feeding the spur from landing point B.

Various publications describe this configuration process. U.S. Pat. No. 5,196,984 discloses a branching unit which employs electrical power feeding for repeaters and multiple branching units. The branching unit terminates three line cables and a sea earth and includes three high voltage element relays, only one of which is energized at a time. When electrical power is supplied between any two line cables, the third is isolated and connected to the sea earth. Short circuit or open circuit faults in one line cable may be isolated and connected to the sea earth, while allowing powering of the remaining two line cables that are free of faults.

Similarly, U.S. Pat. No. 5,214,312 discloses a power feed line switching circuit for a submarine branching unit having first, second and third electrical paths connected in a Y-shaped connection, and first, second and third terminals connected respectively thereto. The power feed line switching circuit also has first, second and third relays each including a drive unit inserted in the first, second and third terminals and a switching unit for disconnecting the corresponding terminal and connecting the terminal to the ground. The relays control the connections between the terminals and electrical paths for establishing a one-end power feed line or a two-end power feed line to maintain power feed for repeaters and the submarine branching unit by the plurality of relays.

U.S. Pat. No. 5,644,466 discloses a submarine cable branching system including a plurality of directional relays in respective power feed paths branched at a common node. Each of the directional relays is energized by a current flowing through the power feed path in a predetermined direction for energizing a corresponding switch provided in a different power feed path to establish a bilateral feed path and further a unilateral feed path. A bypassing switch is provided across one of the switches that forms the bilateral feed path such that the bypassing switch is urged to close in response to energization of a self-sustaining relay provided in the unilateral feed path.

Since the branching unit, repeaters and cables are laid underwater and are thus difficult to maintain, it is important that they have a high reliability to ensure uninterrupted telecommunications between the landing points. During power-up of the main trunk, however, the spur cable will acquire a charge related to the voltage drop at the branching unit and the length of the spur. Switching the spur cable to sea earth (typically the sea water) can cause a rapid discharge, which may damage contacts and relays within the branching unit. In particular, a relay that causes the spur cable to contact sea earth is typically a high-voltage changeover relay. When actuation of the relay causes a make of the switch, an arc discharge will liberate a quantity of contact material. Acting as charge carriers, the liberated material may pass between the just opened contacts in the three-terminal relay. An avalanche effect could take place that causes the main cable to discharge across the contact gap with large amperage, leading to imminent failure or degradation of the relay and connection of the main cable to sea earth. In this scenario, either it could be impossible to power the system up and configure the system or an oscillation could be initiated between the main trunk and spur (see, e.g., U.S. Pat. No. 5,517,383 at columns 1 and 6).

U.S. Pat. Nos. 5,517,383 and 5,841,205 propose circuits to avoid this damage. In the '383 patent, an additional relay D and switch D1 are used to avoid dangerous arcing in the vacuum changeover relay such as C. Relay D is not a changeover relay and can withstand a greater amount of arcing without failing.

The '205 patent discloses the use of a two-stage relay to avoid damage from arcing. In this arrangement, the spur is disconnected from the main trunk when a defined current level is reached and then discharged by shorting its terminal station end (i.e., not underwater). After current in the main trunk ramps to a second level, the spur is connected to sea earth at the branching unit without arcing.

Applicants have found that these prior arrangements introduce unnecessary complexity and expense to a branching unit and its operation. A branching unit needs to be designed that avoids any arc transfer and its subsequent relay damage in any worst-case scenario, including relay degradation due to system cable faults and due to the branching unit configuration sequence.

SUMMARY OF THE INVENTION

Applicants have discovered that the above problem can be overcome with a branching unit that limits the peak current to a level that the high-voltage relay used in the branching unit can withstand without arcing for a number of cycles substantially greater than the expected number of configurations.

Applicants have discovered that surge currents in a spur of a submarine branching unit that is grounded to sea earth during configuration of the branching unit may be minimized by adding a current limiter in series with the sea ground.

Applicants have further discovered that the current limiter in series with the sea ground can advantageously be constructed from at least one inductor, possibly in parallel with at least one resistor. Applicants have further discovered that a system with such a current limiter in place reduces surge currents, both during initial configuration and during switching from faults occurring on a main trunk, thus prolonging the life of the switching contacts.

In one aspect, a branching unit for joining power feed lines of at least three submarine cables consistent with the present invention includes first, second, and third cable terminations each coupled to a power feed line of a respective submarine cable, a ground termination, a current limiter positioned in series between the ground termination and sea earth, and first, second, and third high-voltage relays. Each relay has a coil and a contact, where the coil of each high-voltage relay is positioned between two of the cable terminations respectively. Each coil has an energized state when a first threshold amount of current passes through the coil and a de-energized state when a second threshold amount of current does not pass through the coil. The contact of each high-voltage relay is positioned to connect the respective third cable termination with the ground termination when the respective coil is in an energized state and to connect the respective third cable termination with at least another of the cable terminations when the respective coil is in a de-energized state. More particularly, the current limiter is an inductor. The current limiter may include at least one resistor in parallel to the inductor.

In another aspect, an underwater optical telecommunication link according to the present invention comprises at least three submarine cables extended at least partly in a body of water and having first, second and third power feed terminations at respective landing points, each cable comprising at least an optical fiber and a power feed line electrically connected to the respective power feed termination; at least two power stations at the landing points to feed said power feed lines of the submarine cables; and a branching unit according to one of the other aspects of the invention, in said body of water, for joining said power feed lines of said submarine cable.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Figure 1:
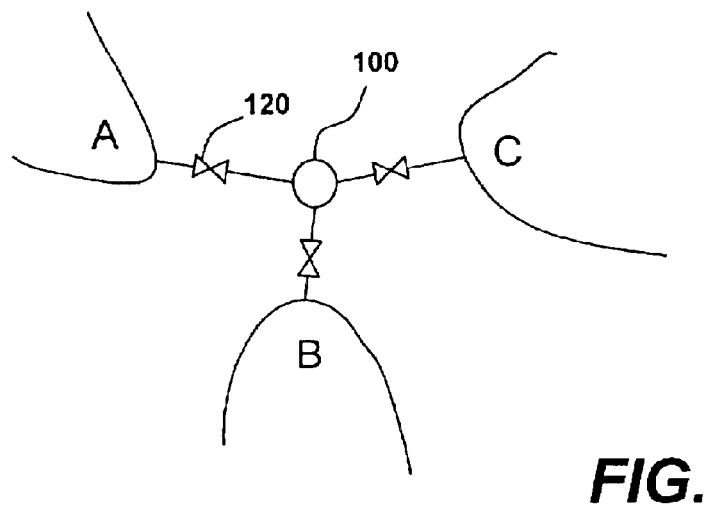
FIG. 1 is an illustration of a branching unit implemented in a submarine telecommunications system having three landing points.

Reference will now be made to various embodiments according to this invention, examples of which are shown in the accompanying drawings and will be obvious from the description of the invention. In the drawings, the same reference numbers represent the same or similar elements in the different drawings whenever possible.

Figure 3A:
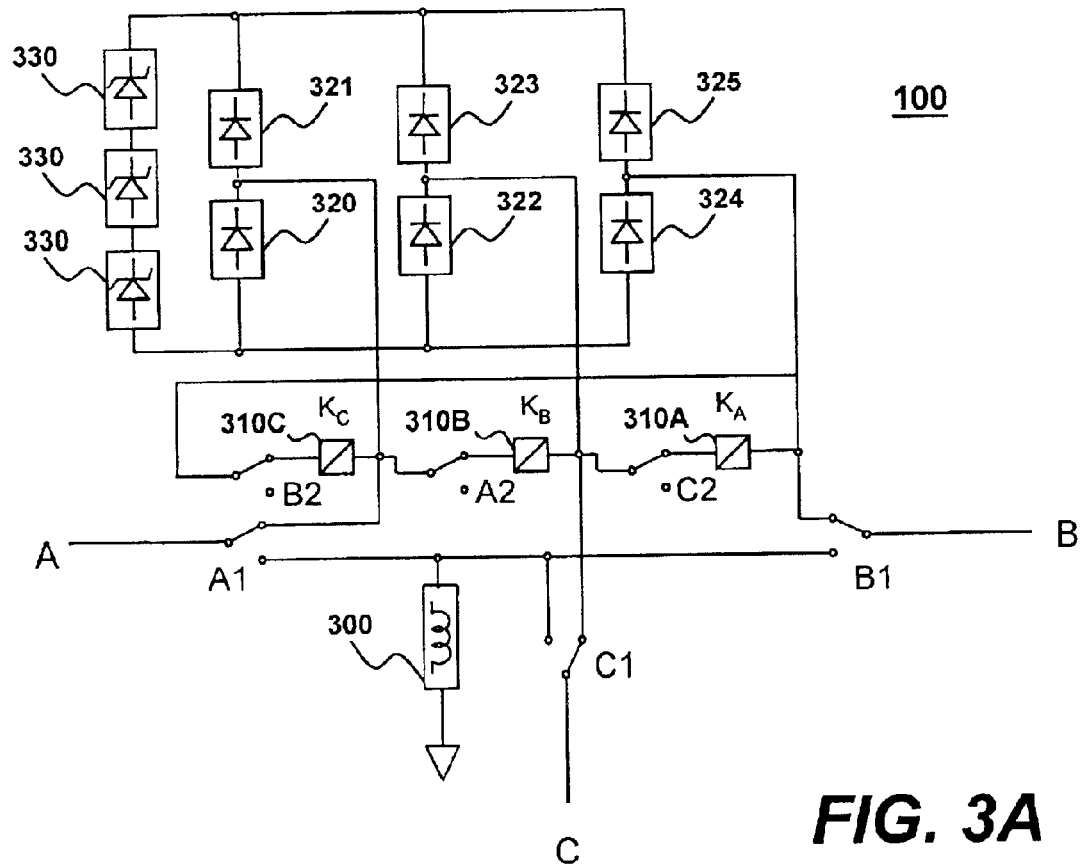
FIG. 3A is a schematic diagram of a branching unit consistent with the present invention in its de-configured state.

In accordance with the present invention, and as generally referred to as 100 in FIG. 3A, a branching unit consistent with the principles of the present invention includes first, second, and third cable terminations each coupled to a power feed line of a respective submarine cable, a ground termination, and first, second, and third high-voltage relays.

As embodied in FIG. 3A, branching unit 100 in FIG. 3A has three terminations or terminals A, B, and C that represent connections to respective landing points A, B, and C of FIG. 1. As will be understood, branching unit 100 is typically submerged in a body of water like a sea or ocean, and submarine cables (not shown) travel from terminals A, B, and C to the landing points across distances. The submarine cables include both optical transmission fiber and power feed lines, which provide electrical power to amplification and maintenance equipment along the cables and within branching unit 100 for establishing and maintaining the optical communications. FIG. 3A illustrates only the circuitry in branching unit 100 that corresponds to the electrical power and switching aspects of that device and not the routing or maintenance of the optical communication system.

Branching unit 100 is symmetrical. In other words, its layout is such that each of the terminals A, B, and C is electrically equivalent to each of the others. In the symmetrical design, a bilateral powering scheme may be established between any two of terminals A–C, and a unilateral powering scheme may be then established for the remaining terminal. FIG. 3A shows branching unit 100 in its quiescent state prior to being configured, where all terminals are connected together and isolated from ground.

Figure 3B:
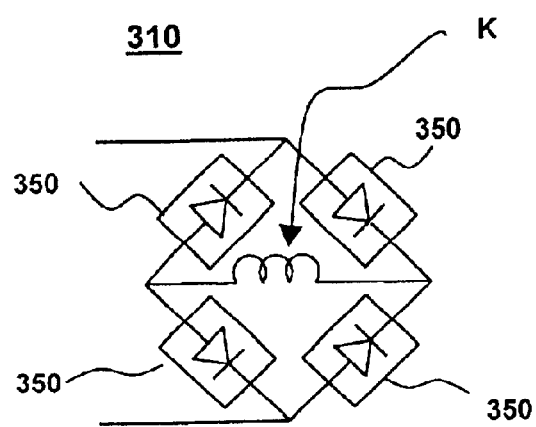
FIG. 3B is a schematic diagram of a coil portion of a high power high-voltage relay used within the branching unit shown in FIG. 3A.

In branching unit 100, three high voltage relays 310 with relay coils $K_A$, $K_B$ and $K_C$ are arranged in a delta network between the terminals A–C. As shown in FIG. 3B, high voltage relays 310 comprise a relay coil K, as well as bridge rectifier diodes 350 to ensure operation of the relay by a freewheeling action in the event of current flow reversal across the branching unit 100. Each high voltage relay 310 has at least two contacts associated with it and may be a vacuum or gas-filled changeover relay. The coil of each relay is disposed between two line terminals in the delta network. In particular, coil $K_A$ of relay 310A is positioned between line terminals B and C, coil $K_B$ of relay 310B is positioned between line terminals A and C, and coil $K_C$ of relay 310C is positioned between line terminals A and B.

The contacts of relays 310 are designated with letters corresponding to their affiliated coil. For instance, contacts A1 and A2 in FIG. 3A are controlled by relay coil KA. In general, contact 1 for a given relay is disposed between the line terminal not joined by that relay and the sea earth, e.g., relay coil KB is disposed between terminals A and C, so that when relay $K_B$ is energized, contact B1 will connect terminal B to sea earth. As well, contact 2 for a relay is positioned in series with the other two relay coils, e.g., contact B2 of relay coil $K_B$ is in series between $K_A$ and $K_C$, so that when relay coil $K_B$ is energized, contact B2 will open. This opening will break the series connection between terminal A and terminal B, which breaks a parallel connection between energized relay $K_B$ and the series connection of relays $K_A$ and $K_C$ and prevents relay coils KA and Kc from energizing.

Any of a variety of presently known or later developed relays 310 can be used. One such suitable relay 310 is commercially available from CII Technologies of Santa Barbara, Calif. (USA) under the H19 or K19 series.

In addition to this main portion of the branching until in the delta-relay network a bridge rectifier places a power supply unit in parallel with whichever high voltage a bridge rectifier places a power supply unit in parallel with whichever high voltage relay 310 that is active in a bilateral powering arrangement between two of terminals A–C. Specifically, at least six bridge rectifier diodes 320–325 are arranged with a series of zener diodes 330, as shown in FIG. 3A. Each zener can be used to feed electrical equipment located within the branching unit, e.g., associated with optical amplifiers. The zener diodes 330 simultaneously offer surge protection to any such electrical equipment. In the illustrated embodiment of the present invention, three zener diodes 330 are used, although other arrangements can be contemplated that do not deviate from the nature of the invention. In general, a lower limit to the number of zener diodes is linked to the pull-in voltage of the relays and an upper limit to the number of zener diodes is linked to dissipation of the relay coil.

The inventors have discovered that placing a surge limiter 300 in series with the sea ground operates to limit surge currents when a cable is switched to sea earth, so as to protect the high voltage relays 310 from damage. The surge limiter 300 comprises an inductor. In one embodiment of the invention, surge limiter 300 comprises one or more inductors. In a second embodiment, surge limiter 300 comprises one or more inductors, in parallel with at least one resistor. In an example of the second embodiment, surge limiter 300 comprises an air wound inductor coil in parallel with four wire wound resistors in series.

Figure 2A:
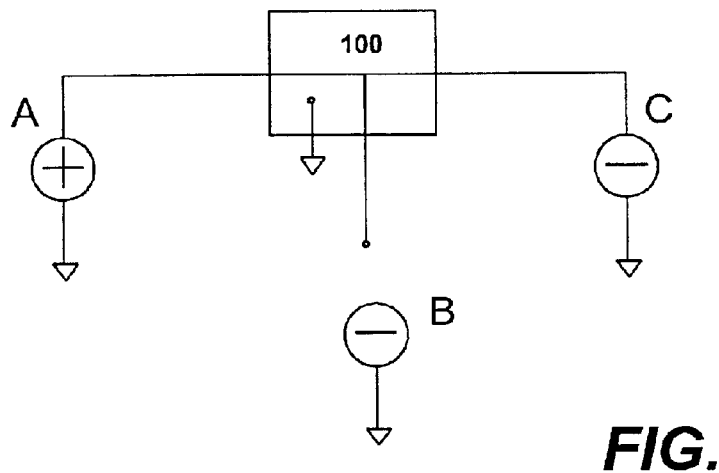
FIG. 2A is a schematic diagram of a branching unit implemented in a submarine telecommunications system after the first step of configuration.
Figure 2B:
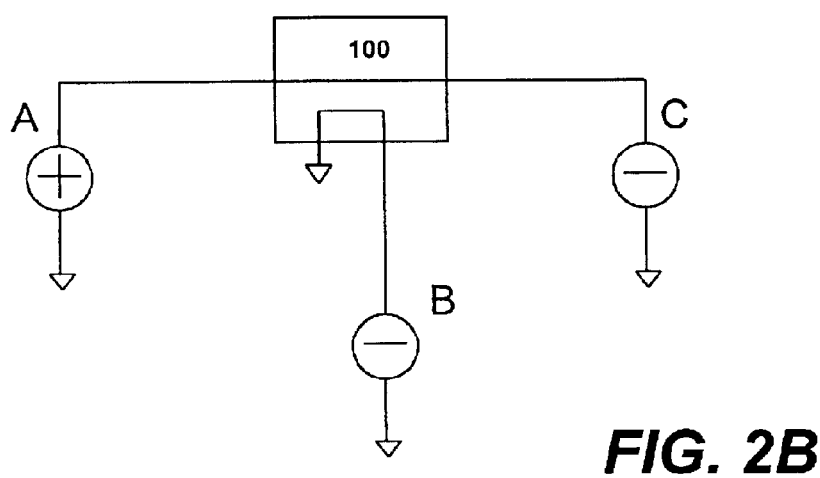
FIG. 2B is a schematic diagram of a branching unit implemented in a submarine telecommunications system after the second step of configuration.

An example of a configuration process for branching unit 100 will help illustrate the present invention. As shown in FIG. 2A, a current flow is first established from landing point A to landing point C. Current will flow into terminal A in branching unit 100 of FIG. 3A, through diodes 350 and coil $K_B$ of relay 310B, and out terminal C. Current will also flow from terminal A, through rectifier diode 321, zener diodes 330, and rectifier diode 322 to terminal C. Power supplies at landing points A and/or C are coordinated to gradually increase the current flow over time. A typical rate at which the current is escalated may be 1 or 2 mA/sec up to a total amperage of 120 mA. As the current reaches a pull-in threshold level, exemplarily of about 60 to 90 mA, sufficient current will pass through coil $K_B$ to cause it to become energized, activating contacts B1 and B2. Contact B1 electrically disconnects terminal B and its affiliated submarine cable spur (not shown) from the other terminals and branches and connects terminal B to sea earth. Also, contact B2 opens, breaking the series connection between coils $K_C$ and $K_A$ and preventing contacts A1 and C1 from changing to sea earth. At this stage, the spur terminal B can be re-connected at its landing point station and is ready to be powered. Terminal B may be powered with a negative or positive voltage, but a negative voltage is typically used to prevent corrosion of the branching unit case and to preserve the integrity of the sea ground. This configured state is illustrated in FIG. 2B.

The voltage drop across the high voltage relay 310B is held in place by zener diodes 330. Because relay coils $K_A$ and $K_C$ are no longer in parallel to relay coil $K_B$, they are unable to be energized. Current in the main trunk, A to C, can now be ramped up, with a typical ramp rate of 10 mA/sec, up to a defined nominal current value for the submarine cable system.

During configuration and power-up of the system, the cable connected to terminal B, the spur cable, will acquire charge. The amount of energy stored in the cable is related to the voltage drop $V_{Cable@config}$ at the branching unit 100 at the point when relay coil $K_B$ becomes energized, generally 60–90 mA. This voltage drop is dictated by the length of the main trunk, A–C, the number of repeaters 110 along the main trunk and the position of the branching unit along the main trunk. The energy in the spur is also related to the length of the spur from the branching unit to the landing point. The subsequent grounding of spur B via the actuation of high voltage relay 310B allows the spur to rapidly discharge. If not for current limiter 300, the rapid discharge of the spur would allow a large amount of current, limited only by the characteristic impedance $Z_0$ of the cable, to flow through the relay contact. Without current limiter 300, the current flowing through relay contact B1 would be dictated by the following equation:

$$I_{peak} = \frac{V_{Cable@Config}}{Z_o} \quad (1)$$

Without current limiter 300, an arc inside the relay 310 could be generated that over time (depending on a number of system configurations) will reduce the life of the relay and consequently reduce the isolation of branching unit 100 to an unacceptable level. Applicants have discovered that current limiter 300 serves to limit the peak current in the relay 310B (and relays 310A and 310B for other start-up configurations) to a level that the relay contacts can withstand for a number of configurations substantially greater than the expected number of configurations actually performed on branching unit 100.

Typical impedance values of submarine cables are around 25–30 Ohms, in relation to the characteristics of the cable that are partly determined by international standards (physical dimensions, type and characteristics of insulating material, etc.). Depending on these typical characteristic impedance values, peak currents arising in the event of a cable fault or during configuration or deconfiguration of the relay have typical transient times in the order of 400 $\mu s$ (FWHM). Considering a safety margin, the current limiter is preferably dimensioned so that the current in the relay remains below a safety threshold value for a time of at least 2 ms.

The high-voltage relay will stay in the energized state as long as the current flowing through its coil stays above a drop-out threshold value that is in general lower than the pull-in threshold current. Exemplary values for the for the drop-out threshold current are in the range of 10–50 mA.

In one embodiment of the invention, Applicants have used an inductor as current limiter 300. In another embodiment of the invention, Applicants have used an inductor in combination with a resistor in parallel for current limiter 300. In order to limit the peak current, the characteristic impedance at the relay contact should be increased at least for the expected pulse duration of 2 msec or frequencies greater than 500 Hz. For lower frequencies, it is desirable that the current limiter 300 behave as close as possible to a short circuit to avoid undesired power dissipation. A good compromise is to use an air coil of about 30 mH in parallel to a power resistance of 70–90 Ohm to give an equivalent impedance of about 63 Ohm for frequencies greater than 500 Hz. The current limiter impedance will be added to a typical line impedance of 25–30 Ohm to give a total limiting impedance of about 90 Ohm.

Applicants have constructed an inductor comprising an air bobbin to avoid any saturation when subjected to high peak current. To be easily located in the branching unit, the air bobbin has been wound on a coil having a large internal diameter (around 150 mm) to allow cable and fibers feeding through and for ease of mounting. The skilled in the art may determine, in each practical case, an appropriate inductance value for the inductor by balancing the advantage of any increase in the impedance value in view of the associated increase in series resistance and in view of space occupation. As a matter of fact, it is desirable to keep the series resistance as low as possible to reduce the DC power dissipation and space occupation is preferably kept to a minimum. Applicant has determined that the inductance value of the inductor, to achieve a significant current limiting effect, should be greater than about 100 $\mu H$, and preferably greater than about 1 mH.

An air bobbin 300 designed for use with this invention has the following physical characteristics. In an example, the internal diameter is about 150 mm, external diameter is about 224 mm, and the width is about 60 mm. In the example the bobbin 300 has around 420 turns of double enameled wire with a diameter of 1.5 mm wound on an insulating support. Such a construction leads to an inductance of about 34 mH, and a series resistance of about 2.2 Ohm. Those skilled in the art will realize that other values could be used in current limiter 300 to achieve desired current limiting results.

In another embodiment of the invention, the inductor within air bobbin 300 is placed in parallel with a plurality of resistors. The parallel resistance serves to avoid any possible high voltage reversal on the inductor when the configuration relay opens. In case of an open circuit, the resistor acts as a discharge path for the inductor, limiting the peak reverse voltage to a few hundred volts. In an example of this embodiment, a series of four wire wound resistors have been used to make the desired value and to be able to withstand the peak power dissipation and the peak voltage across each. The electrical characteristics of each wire wound resistor in the example had a power rating of about 15 W, resistance of about 22 Ohm, limiting element voltage of greater than about 2 KV, and adiabatic energy dissipation of about 120 J. Those skilled in the art will appreciate that resistors having other values could be used in current limiter 300 to achieve desired current limiting results.

Figure 4:
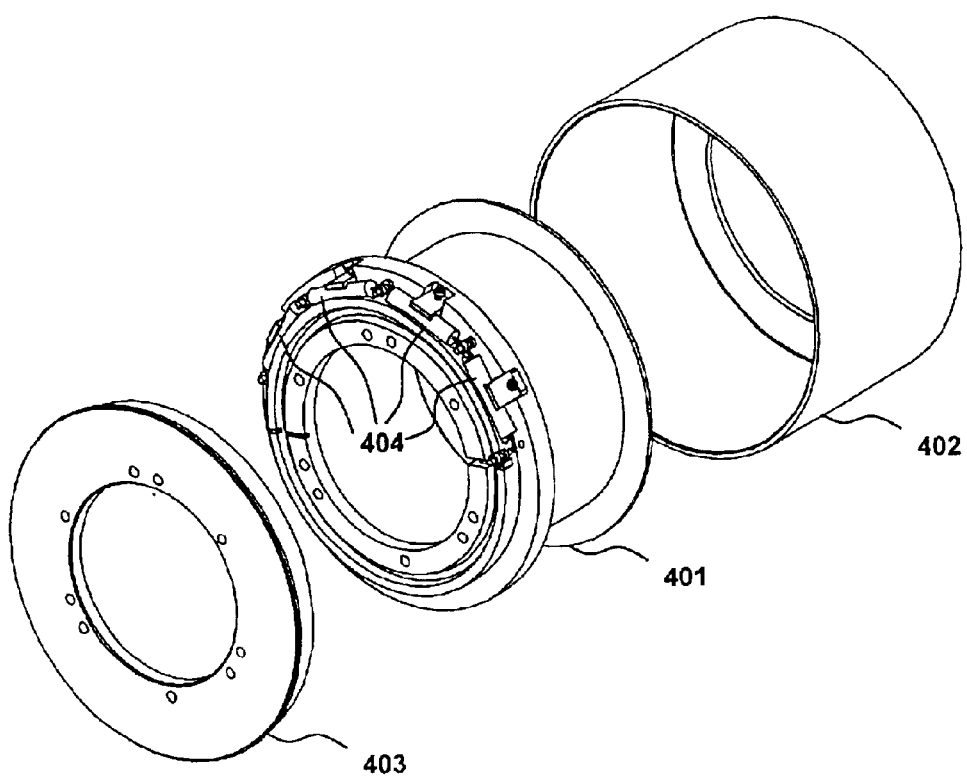
FIG. 4 is an exploded perspective view of a current limiter used within the branching unit shown in FIG. 3A.

An exemplary insulating support 401 for the air bobbin is shown in FIG. 4, together with a bobbin cover 402 and a closing lid 403. Resistors 404, if present, can be arranged on the same insulating support used for the air bobbin, as shown in FIG. 4.

Faults on the main trunk are also important considerations in evaluating the life of a high-voltage relay in a branching unit. Different cable faults on the main trunk after configuration has occurred have different impacts on the behavior of the branching unit. The two fault possibilities are open circuit or short circuit of the main trunk, two locations for the fault can either be "before" the branching unit or "after" the branching unit, and two types of powering schemes for the main trunk can be double-ended or single-ended. A fault "before" the branching unit refers to one that occurs at a location having a higher electrical potential (in absolute value) than the branching unit does, while "after" refers to the opposite situation. Double-ended powering exists when the main trunk is powered at both ends, i.e., positive voltage is applied at one landing point and negative voltage is applied at the opposite landing point. Single-ended powering is when voltage is applied at only one landing point and the opposite is grounded.

A short circuit fault occurs when the electrical conductor in the cable is short circuited with the sea earth (typically, the sea water). An open circuit is an interruption in the electrical conductor without loss of insulation of the insulator, i.e., without contact with the sea water.

Figure 5A:
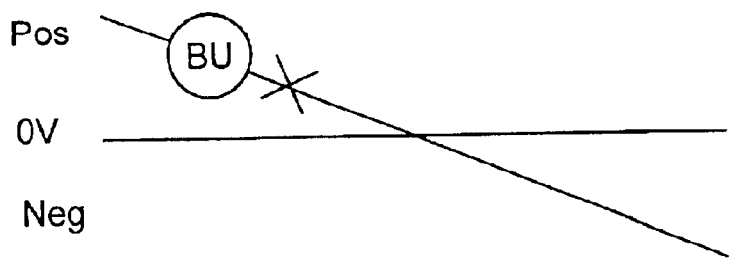
FIG. 5A is a plot of electrical potential versus distance showing a cable failure "after" a branching unit in a double-end feed system.
Figure 5B:
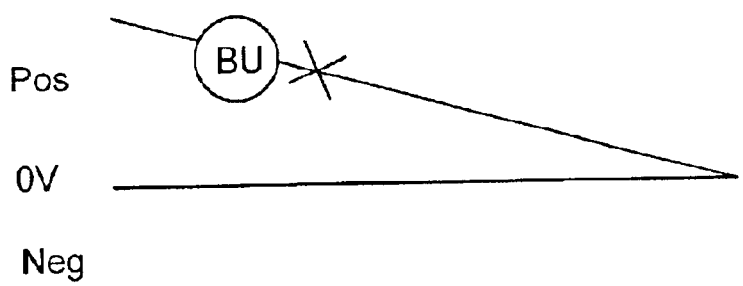
FIG. 5B is a plot of electrical potential versus distance showing a cable failure "after" a branching unit in a single-end feed system.

The following describes the operation of branching unit 100 consistent with the present invention in a failure caused by an open circuit "after" the branching unit on either a single-end or double-end powered main trunk after configuration has taken place. FIG. 5A depicts a plot of electrical potential versus distance and shows an open circuit failure in a double-end feed system that occurs "after" the branching unit, while FIG. 5B illustrates a similar plot for a single-end feed system. In these events, the current keeping the high voltage relay 310 energized will decrease due to the open circuit, causing the affiliated contact 1 to disconnect the spur cable from sea earth and return branching unit 100 to its de-configurated state. For example, if branching unit 100 has been configured so that the main trunk is cables A–C as described above, and an open circuit fault occurs on submarine cable C, then current will stop flowing in the main trunk. As such, relay 310B will become de-energized, causing contact B1 to change from contacting sea earth to contacting the main trunk. That is, the spur cable attached to terminal B will be switched from sea earth to the main trunk, and branching unit 100 will essentially return to a de-configured state. This switching causes the contacts of B1 to go from 0 KV at sea earth to up to $$\frac{2}{3} * 10 \text{ kV}$$

for a main trunk voltage of 10 kV, resulting in a large amount of current flowing through high voltage relay contact B1. Such a current is evaluated according to the following equation:

$$I = \frac{2}{3} * Vsyst * \frac{1}{Z_o} \tag{2}$$

where Vsyst is the maximum system voltage at the branching point, and $Z_0$ is the characteristic impedance of the submarine cable. Consequently, an arc will appear in the relay, which basically shorts the high voltage to sea earth via the same arc discharge phenomenon described above. In this case, the amount of current flowing in the relay can become in the order of:

$$I = 2 * Vsyst * \frac{1}{Z_o} \tag{3}$$

This is what happens with the circuit described by M W Perry, G A Reinold and P A Yeisley in an article entitled "Physical Design of the SL Branching Repeater" in *Journal of Lightwave Technology*, Vol. LT-2, Dec. 1984, pp. 889–894.

Applicant has determined that, with the system described in U.S. Pat. No. 5,841,205, which discloses a so-called two stage configuration system, once the branching unit is de-configured following an open circuit failure, the earth relay D1 is opened before the configuration relay C1. This arrangement is helpful because in the relay envelope the powered cables do then not see the path to earth. But following this de-configuration, current flows from line A and line C into terminal B due to the stored charge in the line and presents a risk of branching unit reconfiguration. In particular, the current flow from the main trunk to the former spur branch is an impulse of high magnitude, with an amplitude exceeding the one required to configure the relays. Under these circumstances, both the configuration relays A–C and the earth relay D have a probability of being energized simultaneously. If the pull in time of the earth relay is less than the configuration relay, the earth relay will energize and the path to earth will re-close, which will remove the two-stage switching function designed to protect the branching unit. The result is that a high current path can be made through the earth relay with subsequent possible damage according to the following:

$$I = 2 * Vsyst * \frac{1}{Z_o} \tag{4}$$

In contrast, Applicants have discovered that, in the present invention, as long as the relays are qualified to withstand the current of Equation (2), even if an arc is developed in the relay envelope, the current to sea earth is always limited by the equivalent impedance of the current limiter 300 (around 63 Ohm in the example) added to the cable characteristic impedance. Thus, the present invention limits the current to sea earth and protects the relay 310 even in the event of re-configuration after an open circuit failure.

Figure 6A:
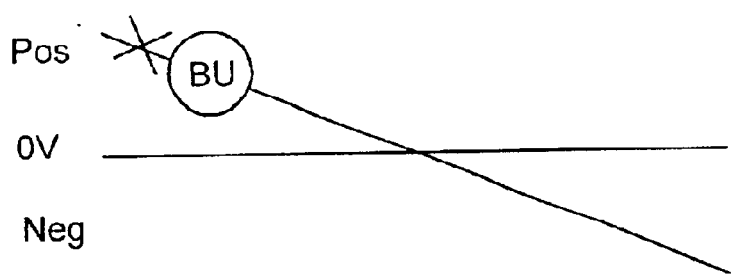
FIG. 6A is a plot of electrical potential versus distance showing a cable failure "before" a branching unit in a double-end feed system.
Figure 6B:
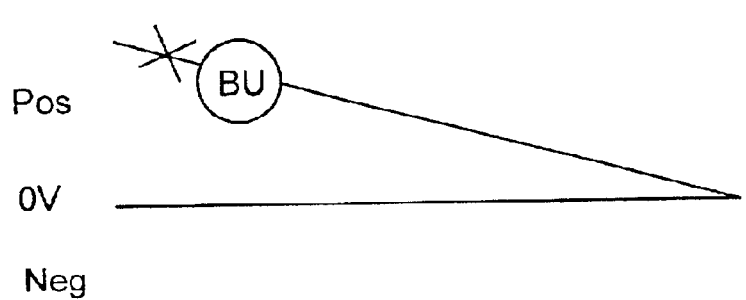
FIG. 6B is a plot of electrical potential versus distance showing a cable failure "before" a branching unit in a single-end feed system.

Performance of branching unit 100 is somewhat different in the event of an open circuit failure "before" the branching unit in either a single-end or double-end powering scheme. FIG. 6A depicts a plot of electrical potential versus distance and shows an open circuit failure in a double-end feed system that occurs "before" the branching unit, while FIG. 6B illustrates a similar plot but for a single-end feed system. In these situations, the current in the main trunk also falls below a level necessary to keep the high voltage relay 310B energized, causing contact B1 to return branching unit 100 to its de-configured state. However, due to the relationship between the potential at the fault location and the lower potential at the branching unit, the main trunk cable will rapidly discharge. As a result, the de-configuration switching will occur with little risk of catastrophic arcing.

Figure 7:
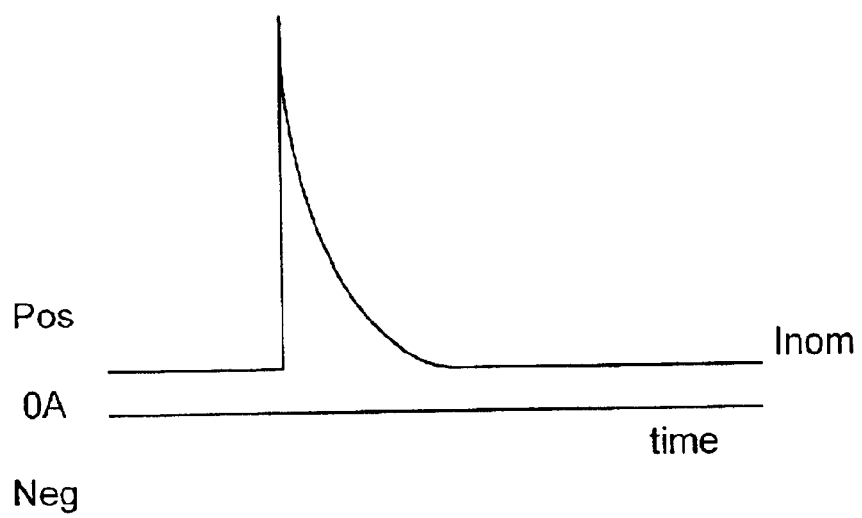
FIG. 7 is a graph illustrating the current flowing through a configured branching unit that undergoes a short circuit failure "after" a branching unit in a double-end feed system.

The following describes the operation of branching unit 100 consistent with the present invention in a failure caused by a short circuit in the main trunk with the sea water or sea ground after configuration has taken place. In normal post configuration use, a nominal current flows through the branching unit 100. When a short circuit happens "after" the branching units, a peak pulse current of the same polarity will be superimposed upon the nominal current. A graph of such is shown in FIG. 7, which illustrates the current flowing through a configured branching unit that undergoes a short circuit condition "after" the branching unit. In this situation, because the superimposed current flows in the same direction as the normal current, relay coil 310B remains in its energized state. Consequently, a short circuit in the main trunk of branching unit 100 that occurs "after" the branching unit does not de-configure the branching unit.

Figure 8A:
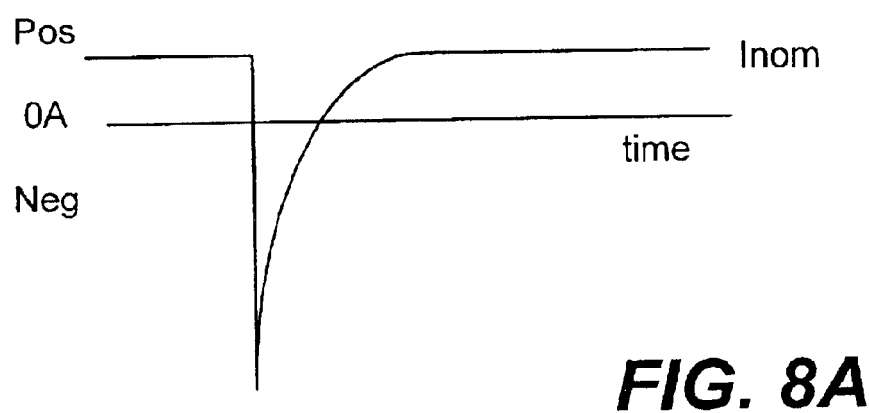
FIG. 8A is a graph illustrating the current flowing through a configured branching unit that undergoes a short circuit failure "before" a branching unit in a double-end feed system.
Figure 8B:
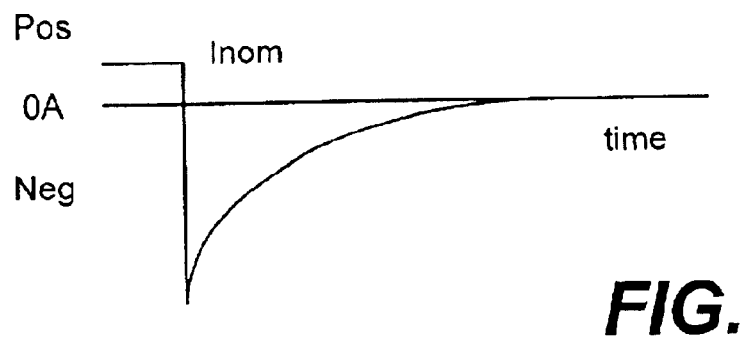
FIG. 8B is a graph illustrating the current flowing through a configured branching unit that undergoes a short circuit failure "before" a branching unit in a single-end feed system.

FIG. 8A is a drawing illustrating the current flow upon a short circuit failure that occurs "before" the branching unit in a double-end feed system, and FIG. 8B illustrates a similar situation in a single-end feed system. In normal post configuration use, a nominal current flows through the branching unit 100. When a short circuit happens "before" the branching unit, a peak pulse current of the opposite direction will force the current at the branching unit to go negative for a time before returning to the positive nominal value (in a double-end fed system) or to zero (in a single-end fed system). In the absence of the diode bridge relays 350 around the coil K as shown in FIG. 3B, the oppositely flowing current may cause the relay 310 to drop out and reconnect the spur cable to the main trunk cable, which would cause a high current surge that may damage the relay 310. However, the diode bridges 350 will act as freewheeling diodes to prolong the magnetic field decay and extend the dropout time of relay 310. U.S. Pat. No. 5,517,383 suggests that this damping effect may be sufficient to keep a relay energized during the period of the line current reversal and to prevent a grounded spur from being connected to the main trunk.

Figure 9A:
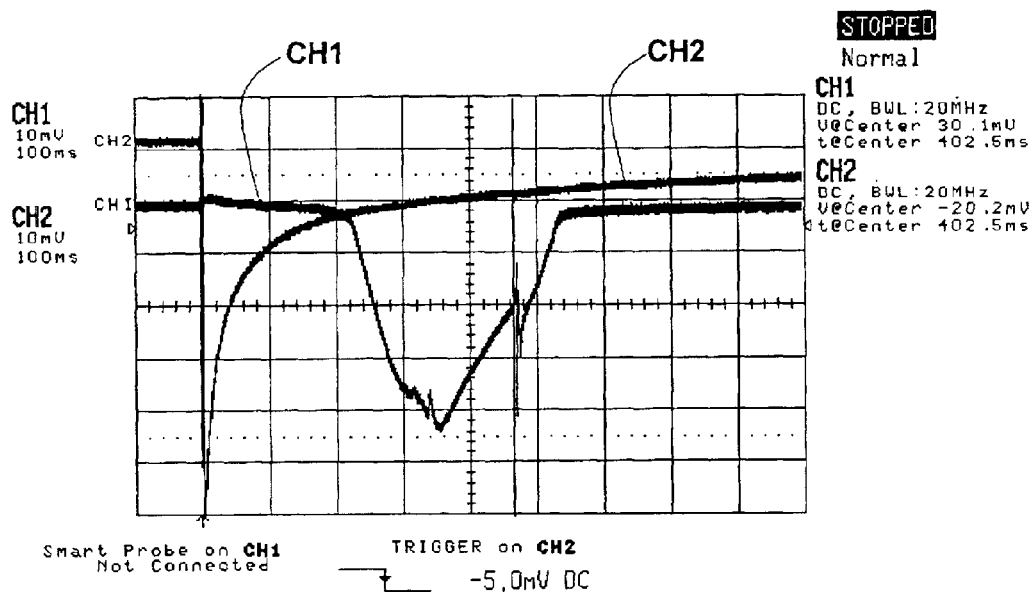
FIG. 9A is a graph of relay coil current and line current versus time in a branching unit that undergoes a short circuit failure "before" the branching unit in a double-end feed system.
Figure 9B:
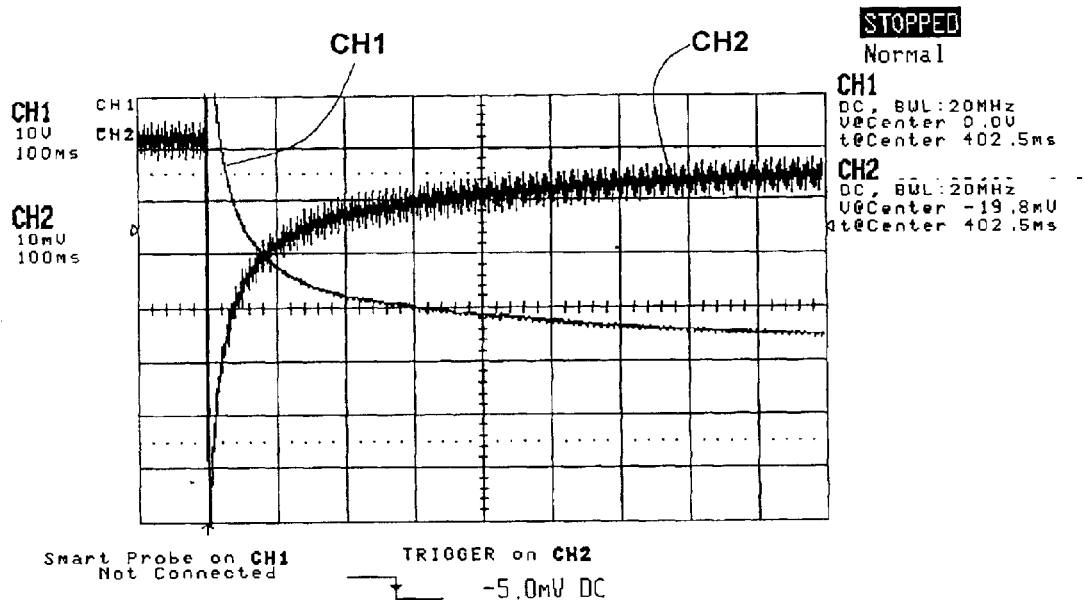
FIG. 9B is a graph of line voltage and line current versus time in a branching unit that undergoes a short circuit failure "before" the branching unit in a double-end feed system.

FIG. 9A shows traces from an oscilloscope displaying the current through relay coil $K_B$ and the current of the main trunk versus time during a short circuit that occurs "before" the branching unit in a double-end feed system. The time scale is 100 ms/div. CH1 in FIG. 9A shows the relay coil current with ground at the bottom of the screen with a scaling of 20 mA/division. CH2 shows the line current with ground being about 3 divisions above the middle of the screen. FIG. 9B depicts traces from an oscilloscope displaying the main trunk voltage at the branching unit and the main trunk current versus time upon a short circuit that occurs "before" the branching unit in a double-end feed system. CH1 in FIG. 9B is the line voltage at the branching unit with ground being in the middle of the screen. CH2 is the line current with ground being about 3 divisions above the middle of the screen. The time scale is 100 ms/div. Following a short circuit failure before the branching unit 100, the line current reverses very rapidly, but the relay coil remains at 120 mA current. The free wheeling diodes 350 operate effectively. However, in this instance the line current takes a long time to return to the nominal positive value and the energy in the coil is not enough to keep the relay energized. After about 350 msec, the relay drops out, returning the branching unit to a de-configured state. However, with the passage of time, the system voltage at the branching unit is very close to zero at this point, so little harm is done to the branching unit upon the reconnection of the spur cable.

Finally, FIG. 8B illustrates the current flowing through a configured branching unit before and after a short circuit condition "before" the branching unit in a single-end feed system. Following this failure, the current will suddenly change polarity and will remain in the opposite polarity until there is complete system discharge. The free wheeling diodes 350 around the relay coil will keep the branching unit configured if the period during the transition of the line current between the relay drop out current value is short enough to allow the energy stored in the relay coil to maintain relay configuration.

It will be apparent to those skilled in the art that various modifications and variations can be made in the disclosed process and product without departing from the scope or spirit of the invention. For example, electronic surge protection could be utilized in surge limiter 300 in place of the inductor or inductor-resistor parallel combination. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A branching unit for joining power feed lines of at least three submarine cables, comprising:

first, second, and third cable terminations each coupled to a power feed line of a respective submarine cable;

a ground termination;

a current limiter positioned in series between the ground termination and sea earth; and first, second, and third high-voltage relays each having a coil and a contact, the coil of each high-voltage relay being positioned between two of the cable terminations respectively and having an energized state when a threshold amount of current passes through the coil and a de-energized state when the threshold amount of current does not pass through the coil, the contact of each high-voltage relay being positioned to connect the respective third cable termination with the ground termination when the respective coil is in an energized state and to connect the respective third cable termination with at least another of the cable terminations when the respective coil is in a de-energized state.

2. The branching unit of claim 1, wherein the first, second, and third high-voltage relays each further comprise a second contact being positioned to de-couple one of the two cable terminations from the third cable termination when the respective coil is in an energized state.

3. The branching unit of claim 1, wherein the first, second, and third high-voltage relays are arranged between the cable terminations in a delta network.

4. The branching unit of claim 1, wherein the respective terminations have at least one zener diode arranged in parallel with the first, second, and third high-voltage relays.

5. The branching unit of claim 1, wherein the first, second, and third high-voltage relays further comprise a diode bridge surrounding the coil.

6. The branching unit of claim 1, wherein the current limiter comprises an inductor.

7. The branching unit of claim 6, wherein the inductor comprises an air bobbin.

8. The branching unit of claim 6, wherein the current limiter further comprises at least one resistor in parallel with the inductor.

9. The branching unit of claim 6, wherein the inductor has an inductance of greater than 100 pH.

10. The branching unit of claim 9, wherein the inductor has an inductance of greater than 1 mH.

11. A branching unit for joining power feed lines of at least three submarine cables, comprising:

first, second, and third cable terminations each coupled to a power feed line of a respective submarine cable;

a ground termination;

a current limiter positioned in series between the ground termination and sea earth; and a switching apparatus positioned between the first, second, and third cable terminations and the ground termination, the apparatus causing the third cable termination to connect with the ground termination when a threshold amount of current flows between the first and second cable terminations.

12. An underwater optical telecommunication link comprising:

at least three submarine cables extended at least partly in a body of water and having first, second and third power feed terminations at respective landing points, each cable comprising a power feed line electrically connected to the respective power feed termination; and a branching unit in said body of water for joining said power feed lines of said submarine cable, wherein the branching unit comprises:

first, second, and third cable terminations each coupled to a power feed line of a respective submarine cable;

a ground termination;

a current limiter positioned in series between the ground termination and sea earth; and a switching apparatus positioned between the first, second, and third cable terminations and the ground termination, the apparatus causing the third cable termination to connect with the ground termination when a threshold amount of current flows between the first and second cable terminations.

* * * * *

UNITED STATES PATENT AND TRADEMARK OFFICE
CERTIFICATE OF CORRECTION

PATENT NO.   : 6,765,775 B2
DATED        : July 20, 2004
INVENTOR(S)  : Alberto Pirovano It is certified that error appears in the above-identified patent and that said Letters Patent is hereby corrected as shown below:

Column 12,
Line 59, "pH" should read -- $\mu$H --.

Signed and Sealed this

Thirtieth Day of November, 2004

JON W. DUDAS
*Director of the United States Patent and Trademark Office*